(12) United States Patent
Rajwar et al.

(10) Patent No.: US 9,182,986 B2
(45) Date of Patent: Nov. 10, 2015

(54) COPY-ON-WRITE BUFFER FOR RESTORING PROGRAM CODE FROM A SPECULATIVE REGION TO A NON-SPECULATIVE REGION

(71) Applicants: Ravi Rajwar, Portland, OR (US); David Lim, Beaverton, OR (US); James Hadley, Portland, OR (US); Matthew Merten, Hillsboro, OR (US); Joseph McMahon, Portland, OR (US); Yury Ilin, Beaverton, OR (US); Justin Deinlein, Portland, OR (US)

(72) Inventors: Ravi Rajwar, Portland, OR (US); David Lim, Beaverton, OR (US); James Hadley, Portland, OR (US); Matthew Merten, Hillsboro, OR (US); Joseph McMahon, Portland, OR (US); Yury Ilin, Beaverton, OR (US); Justin Deinlein, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 13/730,977

(22) Filed: Dec. 29, 2012

(65) Prior Publication Data

US 2014/0189315 A1 Jul. 3, 2014

(51) Int. Cl.
*G06F 15/00* (2006.01)
*G06F 11/00* (2006.01)
*G06F 9/30* (2006.01)

(52) U.S. Cl.
CPC ................................ *G06F 9/30145* (2013.01)

(58) Field of Classification Search
CPC .............................. G06F 9/3842; G06F 9/3857
See application file for complete search history.

(56) References Cited

U.S. PATENT DOCUMENTS

| 7,487,337 | B2 | 2/2009 | Akkary et al. |
| 7,685,365 | B2 | 3/2010 | Rajwar et al. |
| 7,711,932 | B2 | 5/2010 | Akkary et al. |
| 7,809,903 | B2 | 10/2010 | Adl-Tabatabai et al. |
| 8,117,392 | B2 | 2/2012 | Charney et al. |
| 8,180,967 | B2 | 5/2012 | Rajwar et al. |
| 8,180,977 | B2 | 5/2012 | Rajwar et al. |
| 8,190,859 | B2 | 5/2012 | Akkary et al. |
| 8,301,849 | B2 | 10/2012 | Rajwar et al. |
| 8,479,053 | B2 | 7/2013 | Rajwar et al. |
| 8,627,030 | B2 | 1/2014 | Akkary et al. |
| 8,683,143 | B2 | 3/2014 | Akkary et al. |
| 8,881,106 | B2 | 11/2014 | Lachner et al. |
| 2004/0177239 | A1 | 9/2004 | Clift et al. |
| 2005/0038980 | A1 | 2/2005 | Rodgers et al. |

(Continued)

FOREIGN PATENT DOCUMENTS

| WO | WO 2013115816 A1 | 8/2013 |
| WO | WO 2013115818 A1 | 8/2013 |

OTHER PUBLICATIONS

PCT International Search Report and Written Opinion for PCT Counterpart Application No. PCT/US2013/048693, 8 pgs., (Sep. 30, 2013).

*Primary Examiner* — Hyun Nam
(74) *Attorney, Agent, or Firm* — Nicholson De Vos Webster & Elliott, LLP (57) ABSTRACT

An apparatus is described having an out-of-order instruction execution pipeline. The out-of-order execution pipeline has a first circuit and a second circuit. The first circuit is to hold a pointer to physical storage space where information is kept that cannot yet be confirmed as being free of potential dependencies on the information. The second circuit is to hold the pointer if the pointer existed in the first circuit when a non speculative region of program code ended and upon retirement of a following speculative overwriter instruction originally coded to overwrite the information.

28 Claims, 9 Drawing Sheets

(56) References Cited

U.S. PATENT DOCUMENTS

| | | |
|---|---|---|
| 2005/0120191 A1 | 6/2005 | Akkary et al. |
| 2005/0218943 A1 | 10/2005 | Padhye et al. |
| 2006/0149931 A1 | 7/2006 | Haitham et al. |
| 2006/0149934 A1* | 7/2006 | Eickemever et al. ......... 712/219 |
| 2006/0277398 A1 | 12/2006 | Akkary et al. |
| 2007/0043934 A1 | 2/2007 | Sodonai et al. |
| 2007/0260942 A1 | 11/2007 | Rajwar et al. |
| 2008/0005504 A1 | 1/2008 | Barnes et al. |
| 2008/0065864 A1 | 3/2008 | Akkary et al. |
| 2008/0244544 A1 | 10/2008 | Neelakantam et al. |
| 2009/0327661 A1 | 12/2009 | Sperber et al. |
| 2010/0306508 A1 | 12/2010 | Day et al. |
| 2011/0107166 A1* | 5/2011 | Flautner et al. ................ 714/746 |
| 2011/0161639 A1 | 6/2011 | Knauth et al. |
| 2011/0197182 A1 | 8/2011 | Lachner et al. |
| 2012/0117333 A1 | 5/2012 | Akkary et al. |
| 2012/0227045 A1 | 9/2012 | Knauth et al. |
| 2013/0332778 A1* | 12/2013 | Spracklen .................... 714/47.1 |
| 2014/0019735 A1* | 1/2014 | Menon et al. ................. 712/228 |
| 2014/0047201 A1* | 2/2014 | Mehta ........................... 711/158 |
| 2014/0095814 A1 | 4/2014 | Marden et al. |
| 2014/0095838 A1 | 4/2014 | Kadgi et al. |
| 2014/0115596 A1* | 4/2014 | Khan et al. .................... 718/104 |

* cited by examiner

COPY-ON-WRITE BUFFER FOR RESTORING PROGRAM CODE FROM A SPECULATIVE REGION TO A NON-SPECULATIVE REGION

FIELD OF INVENTION

The field of invention pertains to the computing sciences generally, and, more specifically, to a copy-on-write buffer for restoring program code from a speculative region to a non-speculative region.

BACKGROUND

Figure 1:
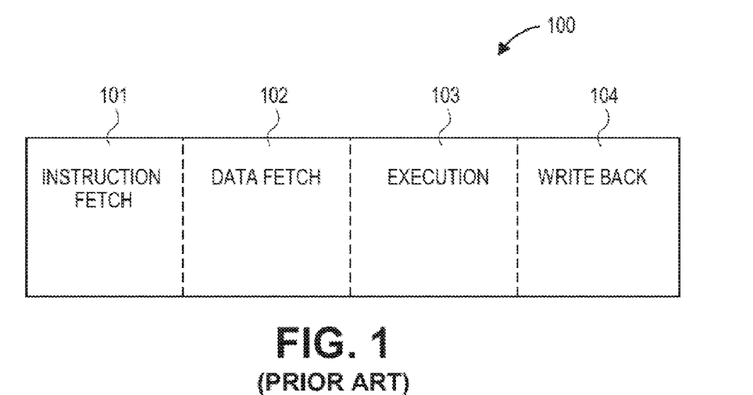
FIG. 1 shows an instruction execution pipeline.

FIG. 1 shows a basic instruction execution pipeline 100. The basic instruction execution pipeline is observed to include: i) an instruction fetch stage 101; ii) a data fetch stage 102; iii) an instruction execution stage 103; and, iv) a write back stage 104. The instruction fetch stage 101 fetches "next" instructions in an instruction sequence from a cache, or, system memory (if the desired instructions are not within the cache). Instructions typically specify operand data and an operation to be performed on the operand data. The data fetch stage 102 fetches the operand data from local operand register space, a data cache or system memory. The instruction execution stage 103 performs the operation called out by an instruction on the operand data that is specified by the instruction and fetched by the data fetch stage 102. The write back stage "retires" the result of the execution, typically by writing the result into local register space.

FIGURES

The present invention is illustrated by way of example and not limitation in the figures of the accompanying drawings, in which like references indicate similar elements and in which:

FIG. 5a shows logic circuit components for performing the process of FIG. 4a;

DETAILED DESCRIPTION

Traditionally a distinction is drawn between "architectural" registers and "physical" registers. Architectural registers are registers specifically called out and comprehended by the executed program code. Physical registers are actual registers to which data can be written to and read from. Typically, a processor has more physical registers than architectural registers. The processor maps reads and writes regarding the architectural registers to the physical register space. In at least some implementations, a subset of the physical registers are identified as the architectural registers, and that subset may change as a program executes.

Figure 2:
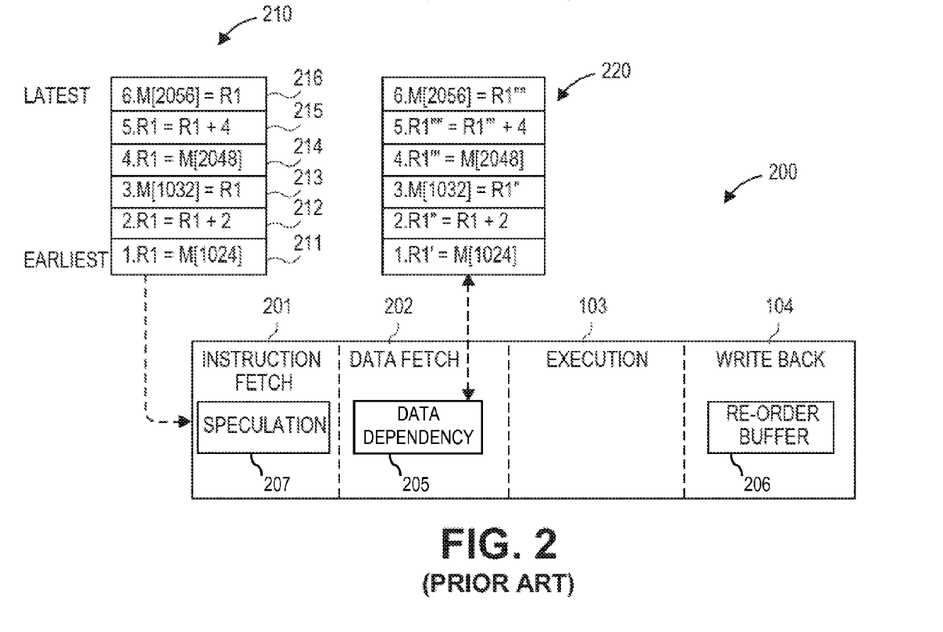
FIG. 2 shows a pipeline that can execution instructions out-of-order and execute instructions speculatively.

As observed in FIG. 2, an instruction sequence 210 executed by an instruction execution pipeline is composed of a series of instructions that a compiler or programmer has determined should be executed in the order the instructions are presented to the pipeline. Here, registers R1 and R2 are understood to be architectural registers as they are specifically called out and comprehended by the program code. Often, the resultant of an earlier instruction is used as an input operand for a later instruction. For example, the resultant R1 of instruction 211 is used as an input operand for instruction 212. In this sense, instruction 212 can be said to have "a dependency" on instruction 211. That is, instruction 212 can not be executed in the execution stage 103 until instruction 211 is executed and its resultant retired. Instruction 213 is also observed to have a dependency on instruction 212.

By contrast, instructions 214 through 216 do not have any dependency on instructions 211 through 213 (instruction sequence 214 through 216 processes data from memory location M[2048] and writes memory location M[2056] which is different than instruction sequence 211 through 213 which processes data from memory location M[1024] and writes memory location M[1032]). Strict in order execution of the instruction sequence 210 will therefore lead to a drop off in performance if delay is encountered fetching the data for instruction 211. As it turns out, the input operand for instruction 211 needs to be fetched from system memory (which is a time wasteful process). As such, all of instructions 212 through 216 must wait until the data for instruction 211 has been retrieved from system memory if instruction sequence 210 is to be processed strictly in order.

In order to avoid the unnecessary delay of an instruction that does not have any dependencies on earlier "in flight" instructions, many modern instruction execution pipelines have enhanced data fetch and write back stages to effect "out-of-order" execution. Here, the data fetch stage 202 of pipeline 200 is enhanced to include data dependency logic 205 to recognize when an instruction does not have a dependency on an earlier in flight instruction, and, permit its issuance to the instruction execution stage 203 "ahead of", e.g., an earlier instruction whose data has not yet been fetched. Typically, physical registers as opposed to architectural registers are used to support the out-of-order execution.

Moreover, the write-back stage 204 is enhanced to include a re-order buffer 206 that re-orders the results of out-of-order executed instructions into their correct order, and, delays their retirement to the architectural register file at least until a correctly ordered consecutive sequence of instruction execution results have retired. Note that in a physical register-based out-of-order machine, the retirement of values to the architectural register file does not involve a copy of the data, but rather a proper management of the mapping between the architectural register ID and the physical register holding the value.

The enhanced instruction execution pipeline is also observed to include instruction speculation logic 207 within the instruction fetch stage 201. Instruction sequences branch out into different paths depending on a condition such as the value of a variable. The speculation logic 207 studies the upcoming instruction sequence, guesses at what conditional branch direction or jump the instruction sequence will take (it has to guess because the condition that determines the branch direction or jump may not have executed or retired yet) and begins to fetch the instruction sequence that flows from that direction or jump. The speculative instructions are then processed by the remaining stages of the execution pipeline 200.

Here, the re-order buffer 206 of the write back stage 204 will delay the retirement of the results of the speculatively executed instructions until there is confirmation that the original guess made by the speculation logic 207 was correct. Once confirmation is made that the guess was correct, the results are retired to the architectural register file. If it turns out the guess was wrong, results in the re-order buffer 206 for the speculative instructions are discarded ("flushed") as is the state of any in flight speculative instructions within the pipeline 200. The pipeline 200 then re-executes from the branch/jump target with the correct sequence of instructions.

Here, instructions must be retired to the architectural register file in order so that stores write to the memory system in the proper order. If execution is stopped for any reason (such as an exception or user breakpoint or interrupt) the state of the retired architectural registers are consistent such that everything before the stopping point has been completed and nothing after the stopping point has been completed.

Traditionally, the size of the re-order buffer 206 determines the number of instructions that can execute out-of-order as well as execute speculatively. Here, the re-order buffer 206 acts as a kind of temporary queue for the results of instructions that have been executed by the execution stage 203, but, are not yet able to be retired. This kind of speculation can be referred to as "traditional speculation".

Figure 3:
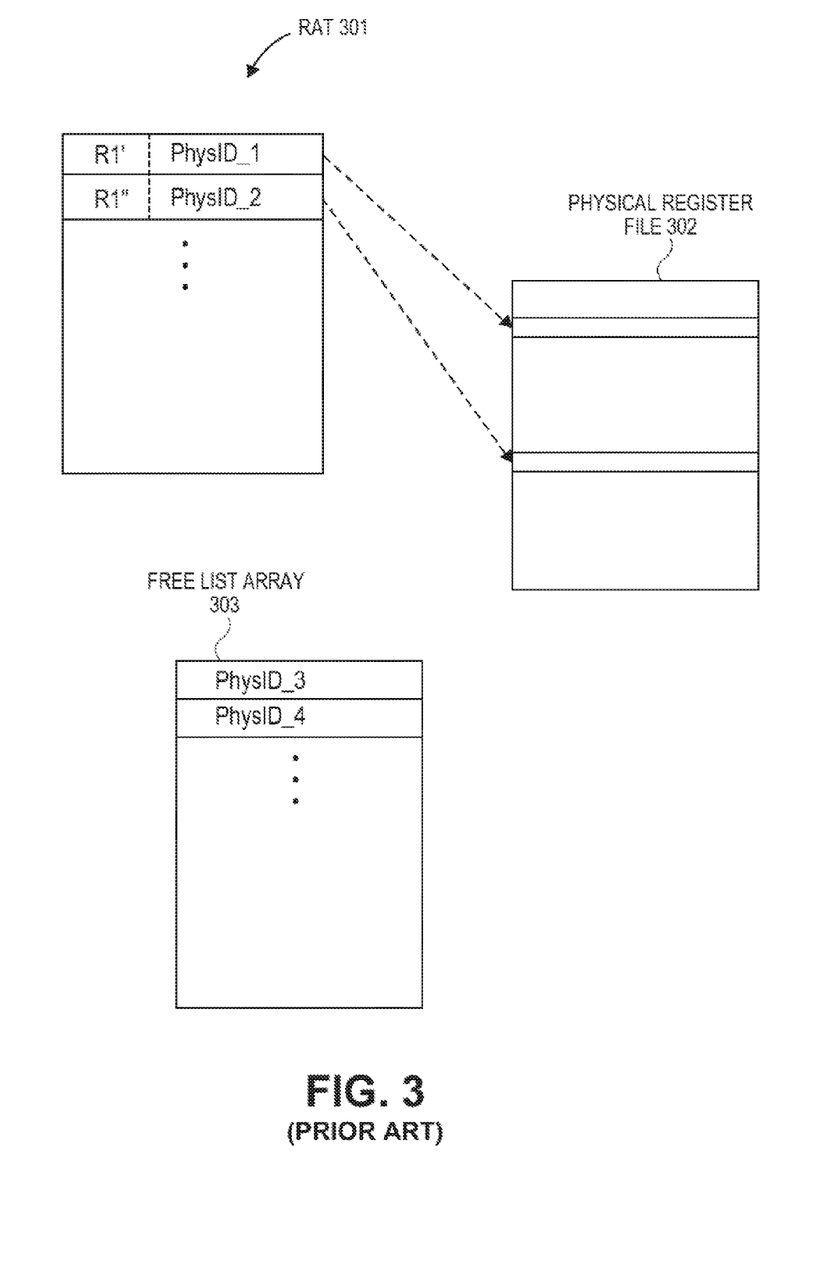
FIG. 3 shows an embodiment of components of data dependency logic circuitry.

FIG. 3 shows pertinent design features of the data dependency logic 205 of the pipeline 200 of FIG. 2. Referring to FIGS. 2 and 3, note that original instruction sequence 210 calls out architectural register R1. Data dependency logic 205 will recognize that: 1) instructions 214, 215 and 216 do not depend on instructions 211, 212 and 213; and, 2) if instructions 214, 215, and 216 are to be executed before or commensurate with instructions 211, 212 and 213 (to effect out-of-order execution), then, in order to calculate the correct resultants, registers other than architectural register R1 need to be referred to (e.g., R1', R1", R1''', R1'''' as discussed below). As such, data dependency logic 205 performs "register renaming" to rename, or map, where appropriate to effect out-of-order execution, the specific architectural registers called out by the original program code to a larger set of "physical registers".

As observed in FIGS. 2 and 3, the architectural register R1 called out by original code sequence 210 of FIG. 2 (R1) is renamed 220 to registers R1', R1", R1''', R1''''. Here, note that renaming can typically be viewed as a form of versioning where R1' is viewed as the older version of architectural register R1" and R1" is viewed as the older version of architectural register R1''', etc.

Renamed registers R1' through R1'''' are, in turn, mapped to physical registers. For simplicity, FIG. 3 only shows the mapping of registers R1' and R1" to Phys_ID_1 and Phys_ID_2. Here, a Register Alias Table (RAT) 301 contains a mapping of the renamed registers R1', R1" to the corresponding physical registers Phys_ID_1, Phys_ID_2 that are used to actually implement the renamed registers R1', R1". The RAT 301 essentially contains a listing of the specific physical registers that the data fetch stage has allocated for the corresponding renamed registers of the instructions that are being processed by the pipeline ("in-flight") but have not yet retired. As observed in FIG. 3, the RAT 301 contains a mapping for each in flight renamed register, and, a corresponding physical address or pointer to its specific, corresponding register in the physical register file 302. Note that RAT 301 represents the correct mapping to the physical registers for the point in the program that is currently allocating into the processor, as well as mappings for older versions of an architectural register that is still in flight, and further contains the mapping for the retired version of the architectural register. The specific structures used to track all in flight renamed versions of an architectural register may vary from embodiment to embodiment.

A free list array 303 also contains a list of pointers to registers in the physical register file 302 whose corresponding register data is not associated with any version of an architectural register including the retired version, or otherwise can be overwritten.

Here, logic circuitry within the data dependency logic 205 (and/or within the write back stage 206) is designed to recognize when no further dependencies exist on a architectural register entered in the RAT 301. Again, typically, the program code that is presented to the pipeline assumes that the pipeline will process the program code strictly in order. As such, a signature within the original program code (i.e., before renaming) that a register is holding information that no following instructions depend on is the first occurrence of an instruction that overwrites the register with new information from memory or another register. Instruction 214 of instruction sequence 210 of FIG. 2 has this property. Such instructions may be viewed as belonging to a class of instructions referred to as "overwriter" instructions.

Upon the retirement of an overwriter instruction, the entry in the RAT 301 for the retired version of the corresponding architectural register that was overwritten in the original code is flushed from the RAT 301, and, the pointer to the physical register file 302 for the flushed entry is moved from the RAT 301 to the free list array 303. For example, when instruction 214 retires, R1''' becomes the retired version, and the previous retired version is no longer needed and can be moved to the free list. That is, renamed register R1" with PhysID_2 is no longer needed, and PhysID_2 can be moved to the free list.

When a new instruction is presented to the data fetch stage 202 for execution, new versions are created and thus new physical registers are allocated for the architectural registers written by the instruction. The new physical registers are allocated by taking pointers from the free list array 303 and creating a mapping from architectural register to the physical register in the RAT 301.

In the case of speculative execution, data dependency logic 205 also has the ability to restore the RAT 301 back to its state at the branch or jump whose direction was incorrectly guessed, or back to the retired values if the machine nukes (that is, the entire pipeline is cleared or flushed).

Recalling that, traditionally, a re-order buffer will retire instruction results to the architectural register file when a series of results are realized in correct sequence order. Physical (actual) registers are written to at execution time. These same registers are deemed 'architectural' when they retire. Depending on implementation, the contents of a retired register could be copied over to an actual architectural register, or simply remain in the physical register file but managed or otherwise tracked as the architectural version vs speculative/physical versions within the RAT.

Moreover, recall that the size of the re-order buffer traditionally sets a limit on the number of instructions that can be executed out-of-order or speculatively. More advanced pipelines are presently being designed to support more aggressive speculation ("extended speculation") whose run length of speculative code can be (e.g., much) larger than the size of the re-order buffer.

In order to support extended speculative execution beyond the size of the reorder buffer, one perspective is that any extended speculative instruction stream may execute and even retire its results to the architectural register file and/or memory, so long as the state of the machine can be brought back to the correct (non-speculative) instruction stream if the speculation was incorrect. In an embodiment, in order to support extended speculative execution, the pipeline is configured to implement an "atomic" scale commitment process when committing extended speculatively executed code. In particular, the results of an entire self consistent region of extended speculative code (a "commit point") is concurrently committed to the true architectural state and/or memory ("commit the region").

In order to support this or other approaches where extended speculative results are actually retired to the architectural register file and/or memory, the RAT and free array list should be designed to prevent the overwriting of information that existed in the physical register file for each of the architectural registers consistent with a program point just before speculation first started (e.g., content within the physical register file for each of the architectural registers consistent with a program point as of the end of non speculation). The corpus of physical register space that is pointed to by the entries in the free list array at the time speculation started is free to be used by the speculative code going forward. However, precautions should be taken to make sure that the corpus of physical register space that is pointed to by the entries in the RAT for each of the architectural registers consistent with a program point when speculation starts should not be overwritten by the speculative code. By so doing, if the code needs to fall back and re-start from the point just before the start of speculation, the state of the program code for each of the architectural registers at the point can be recalled. That is, if a physical register holds a value that is needed after a fall back operation, even if the value is no longer associated with any active version of an architectural register during traditional speculation including the architecturally retired version, the physical register must be preserved.

Thus, in an embodiment, the start of extended speculation is marked and the program code progresses speculatively. As discussed above, in the case of extended speculation instructions are permitted to retire to architectural state.

Recall from the background that, typically, the program code that is presented to the pipeline assumes that the pipeline will process the program code strictly in order. As such, the signature within the original program code (i.e., before renaming) that a register is holding information that no following instructions depend on is the first occurrence of an overwriter instruction.

In the case of extended speculative execution, the speculatively executed code is apt to reach (potentially multiple times, once for each architectural register that is represented in the RAT) a region where a physical register file register that was "live" at the moment speculation started (i.e., there were potential dependences on its associated information) no longer has any dependencies on it. For example, the speculatively executed code is apt to present the pipeline with an "overwriter" instruction that intends to overwrite the information associated with an architectural register. During allocation a new version of that architectural register is created, thus replacing as current an earlier version of a renamed register. The earlier version has an entry in the RAT that was carried over from the non speculative to speculative code regions.

Figure 4A:
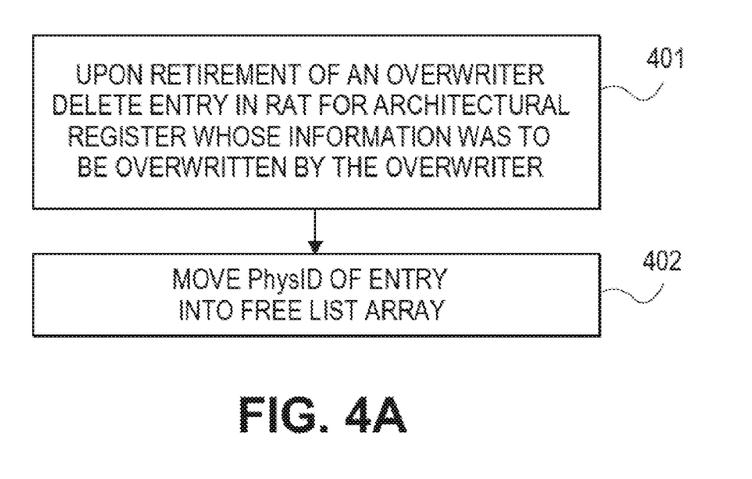
FIG. 4a shows a first process for entering a pointer to physical register space to a free list array.
Figure 5A:
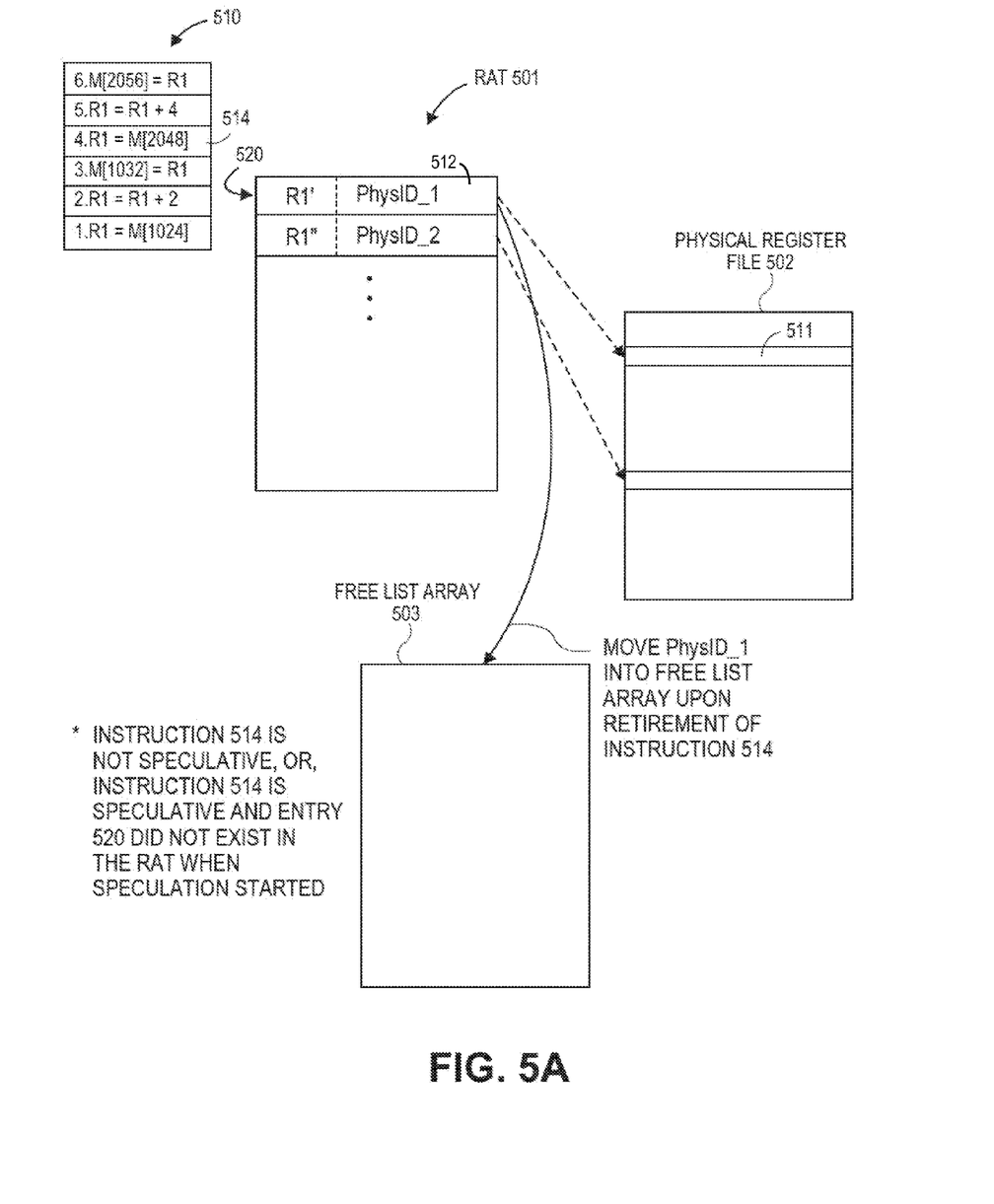

According to traditional register renaming behavior, referring to FIGS. 4a and 5a, upon retirement of an overwriter instruction 514, the entry 520 in the RAT 501 for the retired version of a renamed register 511 whose information was supposed to be overwritten is deleted 401 from the RAT 501, and, the entry's pointer 512 to the physical register space 511 is moved 402 to the free array list 503. This has the effect of freeing up register space 511 for subsequent overwriting.

Figure 4B:
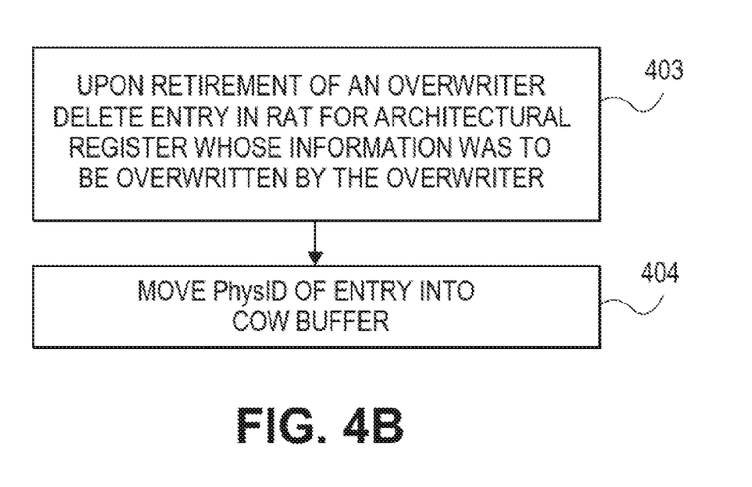
FIG. 4b shows a second process for entering a pointer to physical register space to a COW buffer.
Figure 5B:
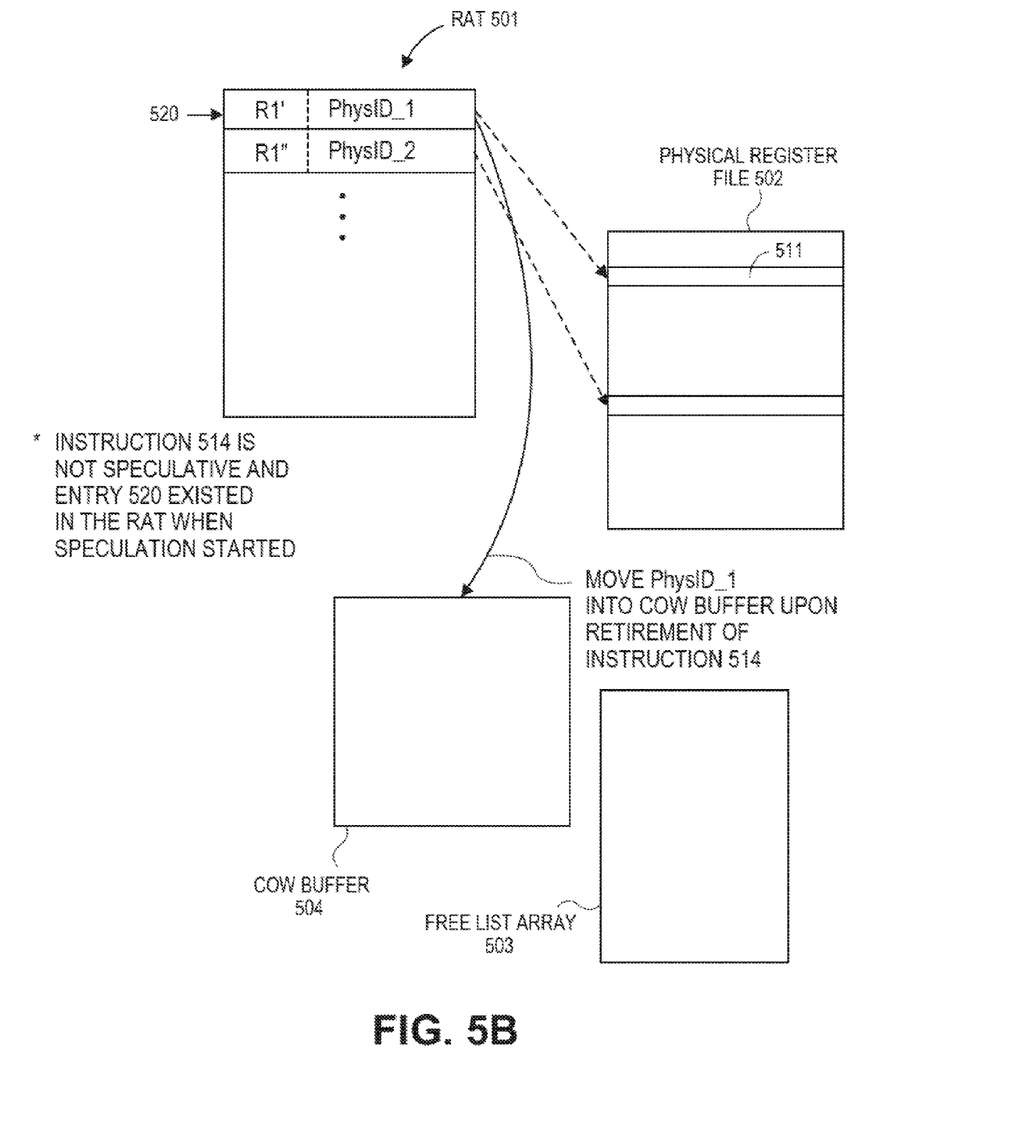
FIG. 5b shows logic circuit components for performing the process of FIG. 4b.

By contrast, in an embodiment, referring to FIGS. 4b and 5b, this behavior is not followed when the overwriter instruction 514 is extended speculatively executed and retired and is attempting to overwrite an older version of a renamed register that had an existing entry 520 in the RAT 501 that was carried over from the non speculative to the speculative code regions. In the case of a speculative overwriter instruction that is to overwrite information having an entry in the RAT that was carried over from the non-speculative to the speculative code regions, the entry's pointer 512 to the physical register space 511 is not moved to the free array list 503 when overwriter instruction 514 retires. Rather, it is moved 404 to a copy-overwrite (COW) buffer 504.

In a further embodiment, the pointer 512 is appended or otherwise linked to the architectural register (R1) that it was associated with in the RAT (e.g., the information of the entire entry 520 is stored in the COW buffer 504). Here, by preventing the pointer 512 from entering the free list array 503, the corresponding physical register space 511 cannot be overwritten by subsequently executed speculative code. By also saving the identity of the pointer's corresponding architectural register, the state information of the RAT 501 for that entry 520 at the end of non speculative execution is essentially being saved. By treating each entry that existed in the RAT 501 that was consistent with the point in the program when non-speculative execution ended in the same fashion, the entire contents of the RAT 501 as of the end of non speculative execution is essentially saved in the COW buffer 504. As such, if needed, the machine can roll-back and restart execution from that state if the speculative execution needs to be discarded.

Thus, to reiterate, in an embodiment, only the entries that exist in the RAT 501 consistent with a point in the program when speculative execution is started have their pointers to physical register space (and, associated logical register names) specially saved to the COW buffer 504. Subsequent entries that are created in the RAT for the (potentially extensive) speculatively executed code have their pointers moved to the free array list 503 upon the retirement of an overwriter consistent with the processes of FIGS. 4a and 5a. By so doing, state information in physical register space 511 reflecting a point in program consistent with the end of non speculative execution is saved thereby permitting program execution to roll-back back to that state should the speculative execution need to be discarded. For extended speculation, in one embodiment, branches are resolved before they retire in the traditional speculation portion of the machine. Here, traditional speculation corresponds to speculation within the depth/size of the reorder buffer. Not specially saving RAT information for RAT entries that are not carried over from the non-speculative region to the speculative region is acceptable regardless if the traditional speculation follows the correct program code path or not. The physical register associated with RAT entry 520 is not moved to the free list array 503 or the COW buffer 504 until the overwriter retires, but which time all prior branches must have been resolved, and correct program code path determined. On a branch misprediction in the traditional speculation portion of the machine, the RAT 501 deletes the mappings to physical registers associated with instructions on the incorrect path, returns their allocated physical registers to the free list array 503, and restores as current the mappings between architectural registers and physical registers, including information about which current RAT 501 entries were carried over from the non speculative region to the speculative region, to the point immediately after the mispredicting branch on the correct path. In another embodiment branch direction is not resolved until after traditional speculation has retired but before extended speculation has committed. In this case, some physical registers may have been returned to the free list array 503 that might be needed on the correct path, and thus the whole extended speculation region must be discarded, the RAT 501 restored from the COW buffer 504, and execution resumed from the restored state.

Figure 6:
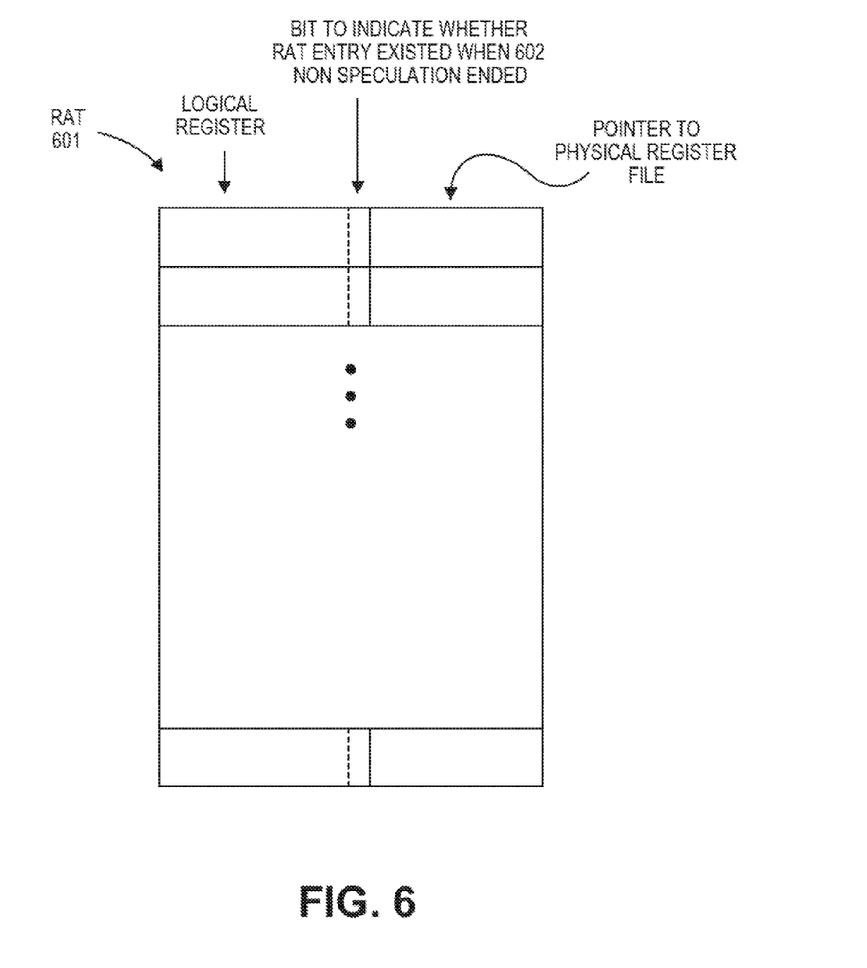
FIG. 6 shows a RAT having a bit for each entry to indicate whether the entry existed in the RAT at the end of non speculative execution.

In an embodiment, as observed in FIG. 6, each entry in the RAT 601 is provided with a bit 602 to indicate whether or not the entry corresponds to an entry that was carried over in RAT 601 from the non speculative region to the speculative region. If the bit of an entry is set to indicate that the entry was carried over in the RAT 601 from the non speculative region, the entry is treated according to the processes discussed above with respect to FIGS. 4*b* and 5*b*. By contrast, if the bit of an entry indicates that the entry was not carried over in the RAT 601 from the non-speculative region, the entry is treated according to the processes of FIGS. 4*a* and 5*a*. By definition, any new entry that is entered into the RAT 601 during the execution of extended speculative code does not have its bit set, thus indicating that it was not carried over from the non-speculative region to the speculative region. This effectively ensures that only the RAT state consistent with a point in the program at the end of non speculative execution is saved across a non speculative/speculative code boundary.

Figure 7:
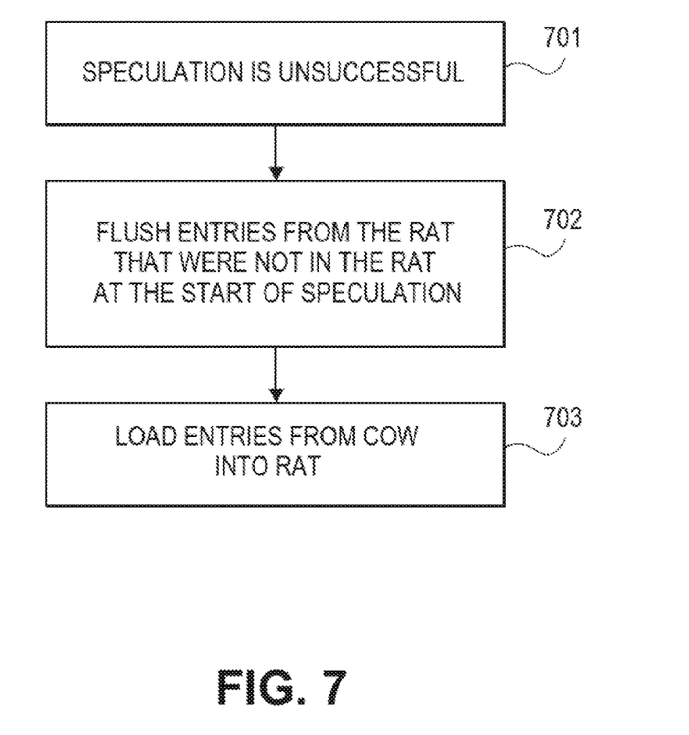
FIG. 7 shows a process for restoring RAT information from a COM buffer in order to rollback program state from a speculative region to a non speculative region.

Referring to FIG. 7, if the speculation is deemed unsuccessful 701, a "pipeline nuke" is performed to clear the pipeline of any state information associated with traditional speculative code. This process will restore the RAT to be consistent with the current retirement point in the re-order buffer. Any results in the re-order buffer that were determined speculatively through traditional speculation may also be flushed from the re-order buffer, and their corresponding physical registers identifiers returned to the free list array. Then, the RAT entries that were not carried over from the non-speculative region to the speculative region are flushed from the RAT 702. Here, any pointers of such entries are returned to the free array list to permit their associated information in the physical register file to be overwritten. The saved RAT entries within the COW are then re-populated back into the RAT to restore the RAT to a point in the program just before speculation started 703. So doing has the effect of rolling back program execution to its last non-speculative point.

The physical register file 502 discussed above is typically used to hold operand data and resultants of "mathematical and/or logic" operations performed on the operands. There are typically two kinds of such operands/resultants: integer and floating point. Here, physical register space 502 may be viewed as corresponding to one or the other or both depending on implementation. Other kinds of information may be stored in register space that is typically not associated with the operands/resultants of standard mathematical/logic operations. Examples include control or control-like information kept in model specific register (MSR) space, and/or control and/or status flag register space used to help direct program flow (e.g., an MXCSR register that stores program directives, flags and masks (e.g., underflow mask, overflow mask, round-to-zero, round positive, round to nearest, precision flag, etc.). Again, register file 502 may be presumed to include such registers.

Normally, however, program control register space such as the contents of an MXCSR register is not the type of register space associated with register renaming and out-of-order execution. Therefore there may not be any entry in a RAT for a mapping to a specific version or physical register, even though it is part of the state of executing program code. In other embodiments, these types of registers may be versioned and renamed into a separate physical register file that is separate from the physical register file used for data. Further this physical control register file may not be of sufficient size or may not be of a sufficient organization (e.g., an array of physical entries organized as a properly ordered list) to preserve overwritten versions until the speculative region commits while allowing additional entries for traditional speculative. As such in these embodiments, when the end of non speculative execution is recognized but before the start of execution of speculative program code, according to one embodiment, the allocation pipeline includes logic circuitry to automatically dump such program control content into temporary integer or floating point logical register space 502 and create a corresponding entry in the RAT including the setting of the bit to indicate the entry was present in the RAT as of the end of non speculative execution. By so doing, the program control state information of the code will also not be overwritten by the speculative code according to the processes discussed above with respect to FIGS. 4*b*, 5*b* and 6. If the speculation is to be discarded and the program returned to its last state prior to the start of speculation, after the RAT is repopulated with the contents from the COW buffer, the entry corresponding to the program control state information is dumped back into its appropriate register space by special logic circuitry of the pipeline. Note that throughout extended speculation, the pointer to the saved copy of the MXCSR register may reside in RAT 520. Only if the same temporary register is overwritten inside the extended speculation region will the pointer to the physical register containing the saved copy of the MXCSR register be moved into the COW. In another embodiment, the allocation pipeline may insert micro-operations into the pipeline that perform the dump into the temporary registers. In a further embodiment, an architectural instruction that signals the beginning of extended speculation may include dedicated micro-operations to perform the dump into the temporary registers.

In a similar vein, certain areas of "same" defined register space can exist in different physical locations. For example, 8-bit AH register space, which is logically bits 8-15 of parent register RAX, may be stored in a different physical location than the 8 bit allocation for it within its parent RAX register. As such, in an embodiment, prior to the start of speculation, the separately stored AH portion is combined back into its RAX parent by special logic circuitry so that only one RAT entry and one physical register contain all of the RAX data, and, only one COW entry would need to be created for the RAX and AH data items if RAX (and therefore implicitly AH) is overwritten inside the extended speculation region rather than two. If the speculative code has to be rolled back to the end of non speculative state, the pipeline includes special logic circuitry that can separately store the AH information from the RAX register space to reflect the state of the code at the end of its non speculative region. In another embodiment, the RAT will be restored with the mapping of RAX to the single combined physical register, and an indication set in the RAT that AH is not separate and currently comprehend in physical register mapped to RAX. Like with control register state, the merge may be performed by dedicated allocation pipeline circuitry, by micro-operations inserted by the allocation engine, or by dedicated micro-operations included in the micro-operation flow of instructions that indicate the start of extended speculation.

Furthermore, even though the RAX parent is combined at the beginning of the speculative region, the AH information might be written alone inside the speculative region (thus creating a COW entry mapping AH to its old physical register). Note, however, that the RAT still holds a mapping from RAX (minus the AH part) to the same physical register. If RAX is written to later in the speculative region, the mapping of RAX to the same physical register will be moved to the COW. So the COW will have AH and RAX in two records pointing to that same physical register. Note that this is the last reference to that physical register, but by the processes of FIGS. 4b/5b, that physical register will not be returned to the freelist. Note that there would have been additional cases if AH and RAX could have started the speculative region as two different physical entries.

Architectural result flags of a carry flag ('C') group and different result flag components of an overflow/sign/parity/auxiliary/zero flag ('OSPAZ') group can also similarly be combined into a single register location just prior to entering a speculative code region. As such, isolated pieces of register state, even including mathematical/logic state, may be combined into same register space just prior to entry into a speculative code region to reduce COW entry overhead.

The discussion above has primarily contemplated the presence and control of the free list array within the data fetch stage, assuming that the RAT tracks all in-flight versions of each architectural register including the retired version. In an alternate implementation, the free list array is managed by logic circuitry of the write back stage in conjunction with the operation of a register reclaim table (RRT). As observed in FIG. 8, the RRT 830 keeps track of the in-flight (allocated) over-writer instructions whose retirement represents that no dependencies exist on the respective information that the over-writer instruction over-writes in the original, strictly ordered program code. This structure is written when an over-writer allocates into the RAT, and read when the over-writer retires. Without extended speculation, physical register identifiers read from the RRT upon retirement represent physical registers that can be returned to the free list array, as described in FIGS. 4a and 5a.

For each such over-writer instruction, the RRT 830 lists the pointers into physical register space where the information that the over-writer overwrites in the original code resides. Thus, upon retirement of a non speculative over-writer instruction, the instruction's corresponding pointer in the RRT 830 is flushed from the RRT 830 and entered into the free list array 803. Notably, in the particular embodiment of FIG. 8, the free list array 803 and COW buffer 804 are located in the write-back pipeline stage as opposed to the data fetch pipeline stage (although each or one or the other could conceivably be located in the data fetch stage). In an embodiment, in order to support extended speculative execution, similar to the discussion of FIG. 6, each entry in the RRT includes a bit that indicates whether the RAT mapped an architectural register to a physical register that carried over from the non speculative region to the speculative region. As a physical register identifier is replaced from the RAT due to an over-writer, it is placed into the RRT corresponding to the over-writer, and the bit associated with the RAT entry specifying whether it was present at the end of the non-speculative execution is copied into the RRT along with the physical register identifier. Retirement of a speculative overwriter, as a consequence of the set bit, causes the corresponding pointer that is flushed from the RRT to be entered into the COW rather 804 than the free list array 803.

Figure 8:
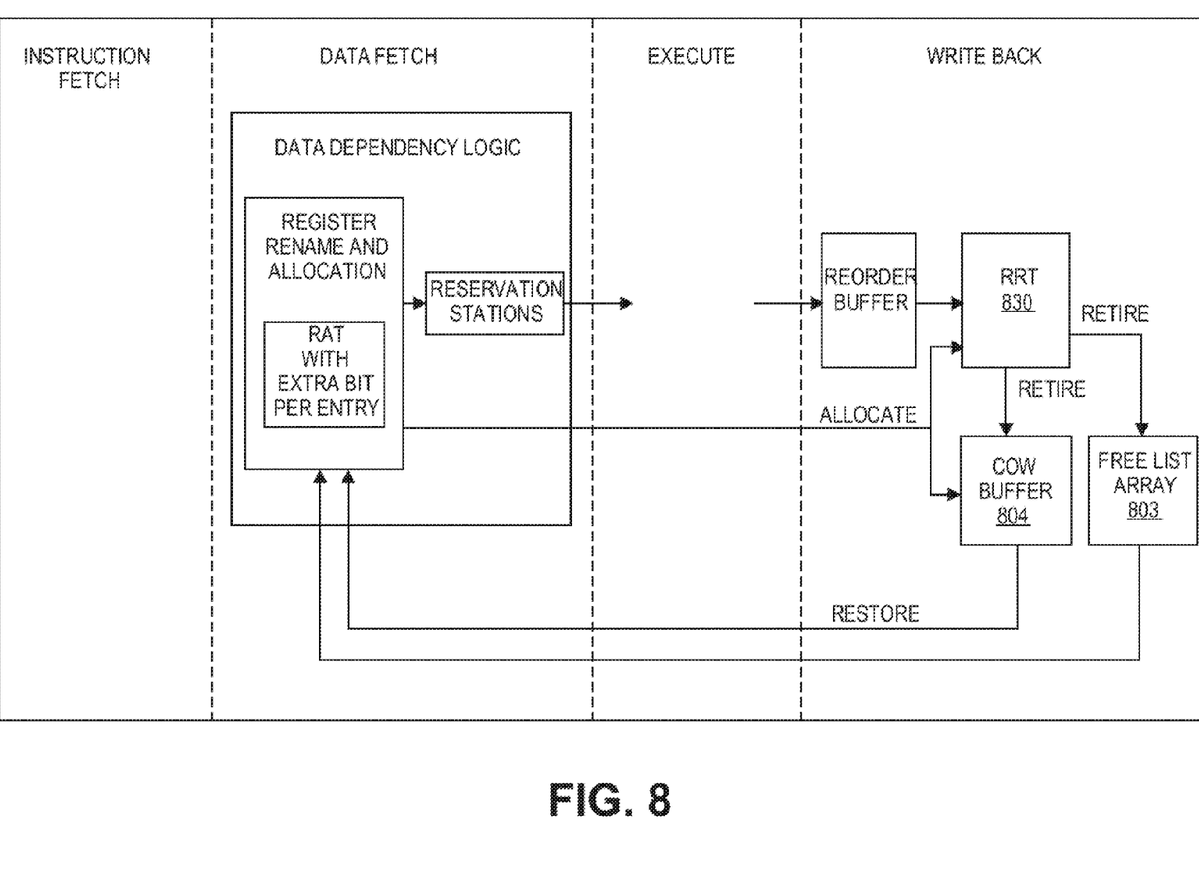
FIG. 8 shows a pipeline having a COW buffer in a write back stage of a pipeline.

In an alternate embodiment, a second RAT (not shown in FIG. 8, also referred to as a Retirement RAT (RRAT)) is located in the write-back stage, whereas the primary RAT is located in the allocation or data fetch stage. The primary RAT tracks the mapping between architectural registers and physical registers during renaming, whereas the retirement RAT in the write-back stage tracks the mapping between architectural and physical registers representing the retired state in program order. When an over writer retires, the over written physical register pointer can be moved from the second RAT to the freelist or to the COW, depending on the processes of FIGS. 4a/5a and 4b/5b.

In an alternative embodiment, rather than have an extra bit for each RRT entry, a separate data structure (not shown in FIG. 8) is used to keep track of the non speculative state information (that is, information that would need to be restored if state must be rolled back due to incorrect extended speculation) that could be overwritten by speculative code if precautions are not undertaken. For example, a non speculative RRT may exist that is separate from the RRT. Upon allocation of a speculative overwriter that could overwrite non speculative state information needed for rollback, an entry is created in the non speculative RRT with a pointer to the impacted non speculative state information (and an identifier of the associated architectural register). In an embodiment, the creation of the entry may include shifting an entry that existed at the end of non speculative execution within the RRT from the RRT to the non speculative RRT.

Speculative overwriters that do not affect non speculative state needed for rollback have entries created in the normal RRT rather than the non speculative RRT. Upon retirement of a speculative overwriter instruction that can impact non speculative state, the pointer to the physical register space in the corresponding non speculative RRT entry is automatically moved to the COW (along with the identifier of the logical register). According to one embodiment, both the normal RRT and the non speculative RRT are contained within the traditional speculative portion of the machine. Both are corrected in response to branch misprediction by eliminating entries for overwriters that were on the wrong path. Upon retirement of an overwriter, the overwritten physical registers that are no longer needed as stored in the RRT are moved to the freelist, and the physical registers that must be preserved in case of a rollback as stored in the non speculative RRT are moved into the COW. According to one embodiment, the RRT and the freelist may be a single structure with a pointer that distinguishes the portion representing the RRT and the portion representing the freelist, whereas the pointer is advanced upon retirement of an overwriter effectively moving physical register identifiers from the traditional speculation engine (RRT) portion to the free list portion. Similarly, the non speculative RRT and the COW may be a single structure with a pointer that distinguishes the portion representing the non speculative RRT and the portion representing the COW, whereas the pointer is advanced upon retirement of an overwriter effectively moving physical register identifiers from the traditional speculation engine (non speculative RRT) portion to the COW portion. Because the COW essentially protects a certain amount of register space from over-writing during speculation, the size of the COW can be viewed as setting a limit on how far speculative code can progress in terms of overwriting non speculative state information. In order to reduce COW size, one approach is to permit speculation only for a certain type of register. For example, according to one approach, the COW is designed to support extended speculation for integer registers but not floating point registers. As such, extended speculation can proceed until a first floating point register is used by the speculative code. Upon reaching the first extended speculative instruction that attempts to modify a register type that cannot be modified during extended speculation, an atomic commit is forced upon any speculative retired but not committed instructions. If the atomic commit is not possible, the speculation is rolled back to its last non speculative state.

Note that the above discussion has focused on a circuitry designs for a single thread. Support for speculation for each of multiple threads could be effected by instantiating a separate instance of such circuitry for each of the multiple threads and/or storage for the associated context of each thread.

Upon atomic commit of the extended speculative region, the physical registers mapped by pointers in the COW no longer need to be preserved because there is no further risk of a rollback. After the commit, the physical register identifiers from the COW can be moved to the free list.

Figure 9:
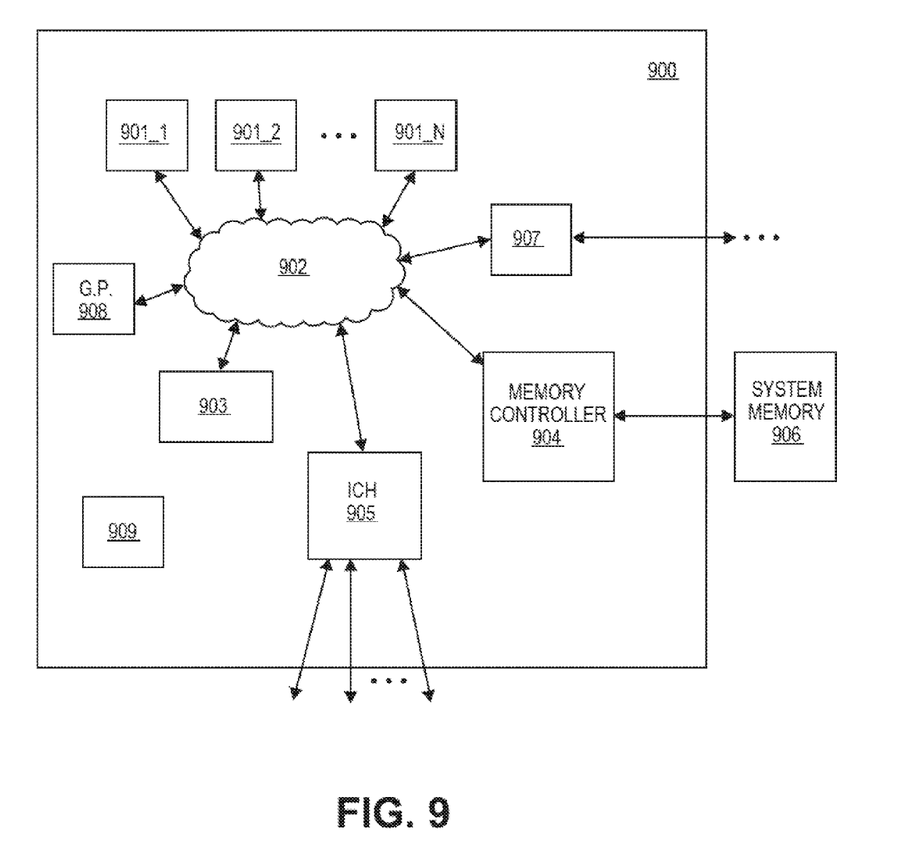
FIG. 9 shows an embodiment of a processor.

FIG. 9 shows the architecture of an exemplary multi-core processor semiconductor chip 900. As observed in FIG. 9, the processor includes: 1) multiple processing cores 901_1 to 901_N; 2) an interconnection network 902; 3) a last level caching system 903; 4) a memory controller 904 and an I/O hub 905. Each of the processing cores contain one or more instruction execution pipelines for executing program code instructions each having a COW buffer for restoring program code from a speculative region to a non speculative region as discussed above. The interconnect network 902 serves to interconnect each of the cores 901_1 to 901_N to each other as well as the other components 903, 904, 905. The last level caching system 903 serves as a last layer of cache in the processor before instructions and/or data are evicted to system memory 906.

The memory controller 904 reads/writes data and instructions from/to system memory 906. The I/O hub 905 manages communication between the processor and "I/O" devices (e.g., non volatile storage devices and/or network interfaces). Port 907 stems from the interconnection network 902 to link multiple processors so that systems having more than N cores can be realized. Graphics processor 908 performs graphics computations. Power management circuitry 909 manages the performance and power states of the processor as a whole ("package level") as well as aspects of the performance and power states of the individual units within the processor such as the individual cores. Other functional blocks of significance (e.g., phase locked loop (PLL) circuitry) are not depicted in FIG. 9 for convenience.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor, comprising:
an instruction execution pipeline comprising a re-order buffer, register renaming circuitry and a register alias table, said register alias table to hold entries to correlate logical registers to physical registers, each of said entries having space to indicate whether its logical register to physical register correlation existed during a transition from a non speculative region of code to a speculative region of code, said speculative region of code capable of extending beyond a size of said re-order buffer such that architectural state is written to during extended speculative execution, said instruction execution pipeline having logic circuitry to perform the following upon retirement of an overwriter instruction of a logical register having an entry in said register alias table:
  enter an identifier of a physical register correlated to said logical register into a free list if said entry does not indicate existence of said entry during a non-speculative code to speculative code transition, said physical register freely useable after placement of its identifier into said free list;
  enter an identifier of a physical register correlated to said logical register into a store if said entry indicates existence of said entry during a non-speculative code to speculative code transition, said physical register not being freely useable after placement of its identifier into said store, said identifier of said physical register and an identifier of said logical register to be moved from said store back into said register alias table upon roll-back of extended speculative code execution to the end of non-speculative code execution.

2. The processor of claim 1 wherein during extended speculative execution branches are resolved before they retire in traditional speculative execution within said re-order buffer's size.

3. The processor of claim 1 wherein speculative branches are permitted to commit to architectural state during extended speculative execution.

4. The processor of claim 1 wherein the instruction execution pipeline performs the following if extended speculative execution is deemed unsuccessful:
  clearing state of traditional speculative execution from said pipeline including clearing contents of said re-order buffer determined from said traditional speculative execution;
  clearing entries of said register alias table that do not indicate existence during a transition from non-speculative to speculative code regions and keeping entries in said register alias table that indicate existence during transition from non-speculative to speculative code regions;
  moving entries in said store to said register alias table.

5. The processor of claim 1 wherein the instruction execution pipeline performs the following as part of a transition from non-speculative to speculative regions of code:
  stores program control content from control register space into temporary register space;
  creates an entry in said register alias table for said temporary register space that indicates existence of said entry during transition from non-speculative to speculative regions of code.

6. The processor of claim 5 wherein said instruction execution pipeline moves said program control content from said temporary register space to said control register space upon failure of extended speculation.

7. The processor of claim 5 wherein said entry in said register alias table for said temporary register space is moved to said store if said temporary register space is overwritten during execution of extended speculation.

8. The processor of claim 5 wherein said entry is moved back into said register alias table upon failure of said extended speculation.

9. The processor of claim 5 wherein said control register space at least includes an MXCSR register.

10. The processor of claim 1 wherein the instruction execution pipeline performs the following as part of a transition from non-speculative to speculative regions of code:
  combines a portion of a first register having reserved space in a second register into said second register;
  creates an entry in said register alias table for said second register that indicates existence of said entry during transition from non-speculative to speculative regions of code.

11. The processor of claim 10 wherein said reserved space is AH space and said second register is a RAX register.

12. The processor of claim 10 wherein said instruction execution pipeline stores said portion back into said first register upon failure of extended speculative execution.

13. The processor of claim 10 wherein said instruction execution pipeline keeps said portion in said second register upon failure of extended speculative execution.

14. The processor of claim 10 wherein said processor stores a first entry in said store for said portion if said portion is separately overwritten during execution of extended speculation and stores a second entry in said store for said second register if said second register is separately overwritten during execution of extended speculation.

15. The processor of claim 1 wherein said free list is managed with logic circuitry in a data fetch stage of said instruction execution pipeline.

16. The processor of claim 1 wherein said register alias table is located in a data fetch stage of said instruction execution pipeline.

17. The processor of claim 1 wherein said register alias table is located in a write back stage of said instruction execution pipeline, said instruction execution pipeline also having another register alias table in a data fetch stage of said instruction execution pipeline, said another register alias table to track logical to physical register correlations during renaming, said register alias table to track logical to physical register correlations representing retired in order program state.

18. A processor, comprising:
an instruction execution pipeline comprising a re-order buffer, register renaming circuitry, a register alias table and a register reclaim table, said register reclaim table to include entries identifying physical registers that previously allocated in the register alias table but for whom, for each of said physical registers, an overwriter of a logical register correlated to a physical register has allocated but not retired, each of said entries having space to indicate whether its physical register existed during a transition from a non speculative region of code to a speculative region of code, said speculative region of code capable of extending beyond a size of said re-order buffer such that architectural state is written to during extended speculative execution, said instruction execution pipeline having logic circuitry to perform the following upon retirement of an overwriter instruction of a logical register having an entry in said register reclaim table:
enter an identifier of a physical register correlated to said logical register into a free list if said entry does not indicate existence of said entry during a non-speculative code to speculative code transition, said physical register freely useable after placement of its identifier into said free list;
enter an identifier of a physical register correlated to said logical register into a store if said entry indicates existence of said entry during a non-speculative code to speculative code transition, said physical register not being freely useable after placement of its identifier into said store, said identifier of said physical register to be moved from said store back into said register alias table upon roll-back of extended speculative code execution to the end of non-speculative code execution.

19. The processor of claim 18 wherein said identifier of said physical register is moved from said register alias table to said register reclaim table upon allocation of said logical register's overwriter into said register alias table.

20. The processor of claim 19 wherein said register alias table has entries to correlate logical registers to physical registers, each of said entries having space to indicate whether its logical register to physical register correlation existed during a transition from a non speculative region of code to a speculative region of code, wherein, when a physical register identifier is moved from said register alias table to said register reclaim table, its associated indication of whether its logical register to physical register correlation existed during a transition from a non speculative region of code to a speculative region of code is also moved from said register alias table to said register reclaim table.

21. A processor, comprising:
an instruction execution pipeline comprising a re-order buffer, register renaming circuitry, a register alias table, a first register reclaim table and a second register reclaim table, both of said register reclaim tables to include entries identifying physical registers that previously allocated in the register alias table but for whom, for each of said physical registers, an overwriter of a logical register correlated to a physical register has allocated but not retired, said instruction execution pipeline capable of executing over a speculative code region that extends beyond a size of said re-order buffer such that architectural state is written to during extended speculative execution, said instruction execution pipeline having logic circuitry to perform the following:
create a first entry in said first register reclaim table for a first overwriter instruction, said first overwriter instruction to overwrite a first logical register that has a corresponding physical register that was not allocated for in said register alias table during a transition from non speculative code to speculative code, said first physical register being freely useable upon retirement of said first overwriter instruction;
create a second entry in said second register reclaim table for a second overwriter instruction, said second overwriter instruction to overwrite a second logical register that has a corresponding second physical register that was allocated for in said register alias table during a transition from non speculative code to speculative code, said second physical register not being freely useable upon retirement of said second overwriter instruction, wherein, an identifier of said second physical register is moved into said register alias table upon roll-back of extended speculative code execution to the end of non-speculative code execution.

22. The processor of claim 21 wherein said first register reclaim table is kept in a structure that also keeps a freelist.

23. The processor of claim 21 wherein an identifier of said second physical register is moved from said second register reclaim table to a store upon retirement of said second overwriter instruction, wherein, said identifier of said physical register is moved from said store into said register alias table upon roll-back of extended speculative code execution to the end of non-speculative code execution.

24. The processor of claim 23 wherein said second register reclaim table and said store are kept in a same structure.

25. The processor of claim 24 wherein said instruction execution pipeline supports extended speculative execution for integer registers but not floating point registers.

26. A processor, comprising:
an instruction execution pipeline comprising a table to hold entries that correlate logical registers to physical registers, said entries having space to indicate whether its logical register to physical register correlation existed during a transition from a non speculative region of code to a speculative region of code, said instruction execution pipeline having a write back stage to write architectural state during extended speculative execution, said instruction execution pipeline having a re-order buffer, said extended speculative execution capable of extending beyond a size of said re-order buffer.

27. The processor of claim 26 wherein said instruction execution pipeline has logic circuitry to perform the following upon retirement of an overwriter instruction of a logical register having an entry in said table:
   enter an identifier of a physical register correlated to said logical register into a free list if said entry does not indicate existence of said entry during a non-speculative code to speculative code transition, said physical register freely useable after placement of its identifier into said free list.

28. The processor of claim 26 where said instruction execution pipeline has logic circuitry to perform the following upon retirement of an overwriter instruction of a logical register having an entry in said table:
   enter an identifier of a physical register correlated to said logical register into a store and not a free list if said entry indicates existence of said entry during a non-speculative code to speculative code transition, said physical register not being freely useable after placement of its identifier into said store.

* * * * *